(12) United States Patent
Iba

(10) Patent No.: US 8,720,669 B2
(45) Date of Patent: May 13, 2014

(54) DEVICE FOR DELIVERING CONVEYING TRUCK INTO SCREW DRIVING AREA

(71) Applicant: Toshiyuki Iba, Osaka (JP)

(72) Inventor: Toshiyuki Iba, Osaka (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 14/080,161

(22) Filed: Nov. 14, 2013

(65) Prior Publication Data

US 2014/0069780 A1 Mar. 13, 2014

Related U.S. Application Data

(63) Continuation of application No. PCT/JP2012/068658, filed on Jul. 24, 2012.

(30) Foreign Application Priority Data

Aug. 1, 2011 (JP) .................................. 2011-168066

(51) Int. Cl.
| | |
|---|---|
| *B65G 33/02* | (2006.01) |
| *B65G 33/32* | (2006.01) |
| *B65G 33/04* | (2006.01) |
| *B65G 33/34* | (2006.01) |

(52) U.S. Cl.
CPC .............. *B65G 33/04* (2013.01); *B65G 33/34* (2013.01)
USPC ........................................ 198/467.1; 198/666

(58) Field of Classification Search
CPC ........ B65G 35/06; B65G 33/32; B65G 33/34; B65G 33/26; B65G 33/04
USPC ............. 198/666, 467.1, 465.1, 465.2, 465.3, 198/459.3

See application file for complete search history.

(56) References Cited

U.S. PATENT DOCUMENTS

| 3,756,372 A * | 9/1973 | Mertens ......................... 198/666 |
| 3,770,148 A * | 11/1973 | Hendren ........................ 198/666 |
| 5,269,402 A * | 12/1993 | Speckhart et al. ........... 198/465.4 |
| 6,910,413 B2 * | 6/2005 | Tweedy et al. .............. 198/467.1 |
| 7,192,094 B2 * | 3/2007 | Kelm .............................. 198/666 |
| 2003/0150648 A1 * | 8/2003 | Kelm .............................. 198/666 |

FOREIGN PATENT DOCUMENTS

| JP | 2001122422 A | 5/2001 |
| JP | 2009263019 A | 11/2009 |
| JP | 2010047399 A | 3/2010 |
| JP | 2010202098 A | 9/2010 |

OTHER PUBLICATIONS

International Search Report Application No. PCT/JP2012/068658 Completed: Aug. 13, 2012; Mailing Date: Aug. 21, 2012 2 pages.

* cited by examiner

*Primary Examiner* — James R Bidwell
(74) *Attorney, Agent, or Firm* — St. Onge Steward Johnston & Reens LLC

(57) ABSTRACT

A device for delivering a conveying truck into a screw driving area has a truck delivery screw and a truck propulsion screw which are connected in tandem via a single position electromagnetic clutch and both the screws are configured to rotate in the same phase in the transmission state of the electromagnetic clutch. Two front and back driven rollers are pivotally connected to a conveying truck at an interval at which the driven rollers can engage both screws. A truck delivery mechanism is provided for delivering the conveying truck in the disengaged state of the electromagnetic clutch while rotating the truck delivery screw by the front-side driven roller until the roller arrives at a fixed position in the truck delivery screw.

5 Claims, 9 Drawing Sheets

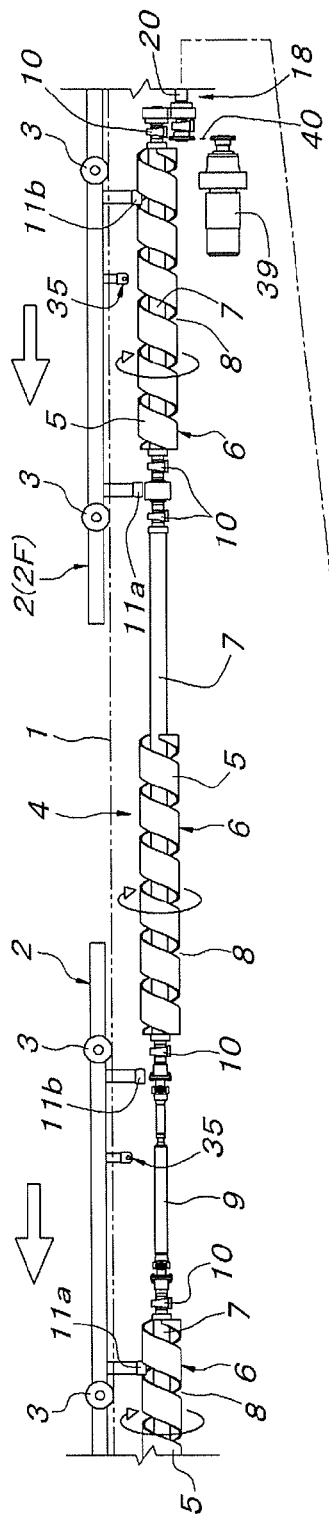
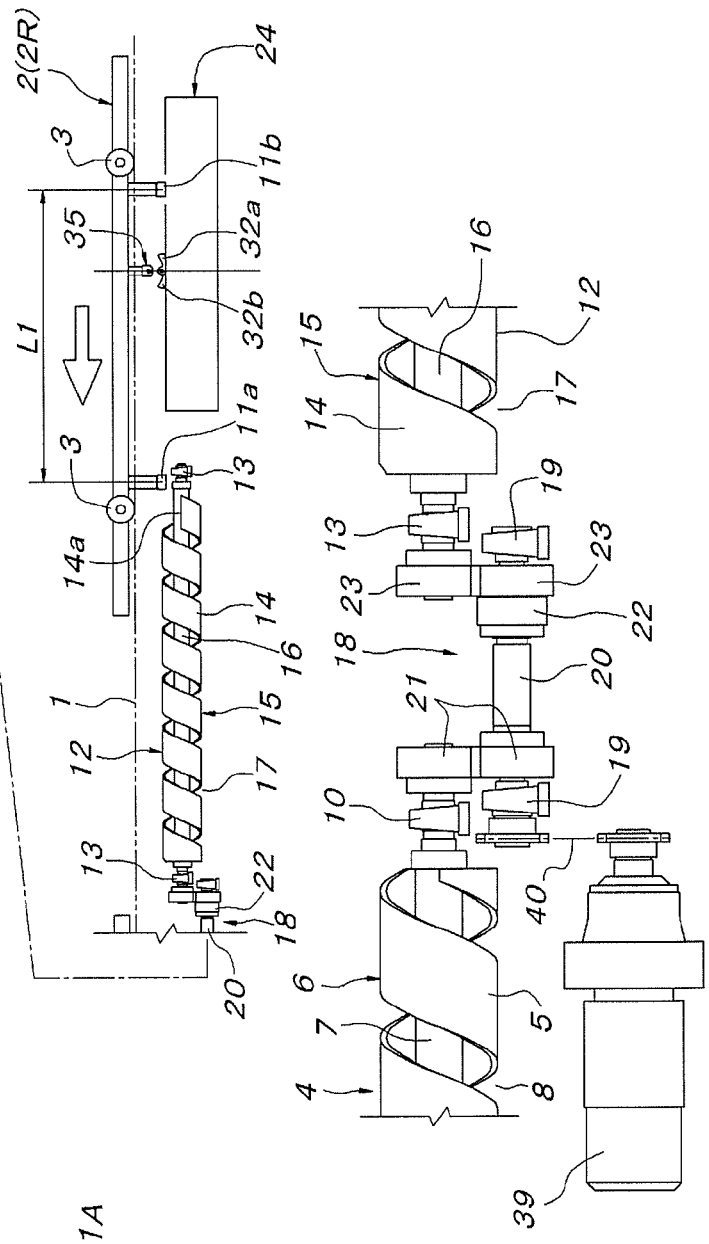
FIG. 1A
FIG. 1B

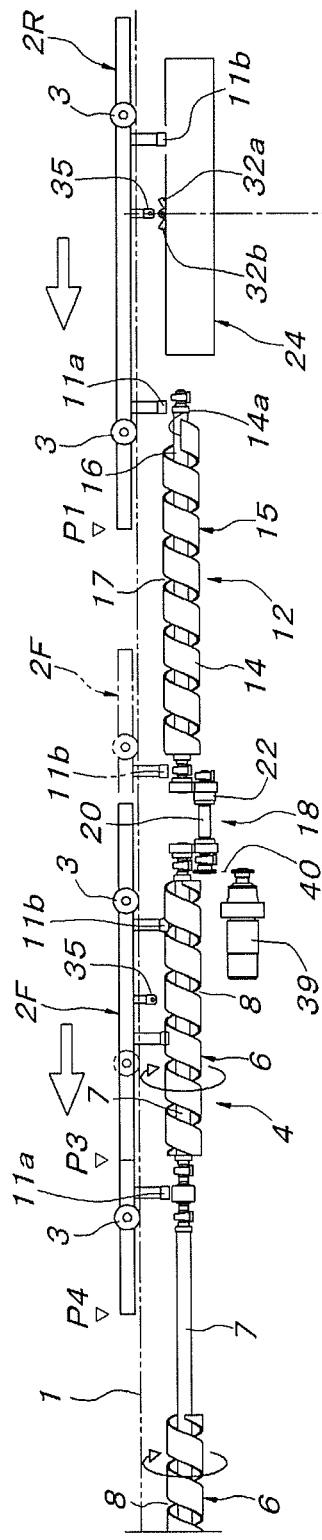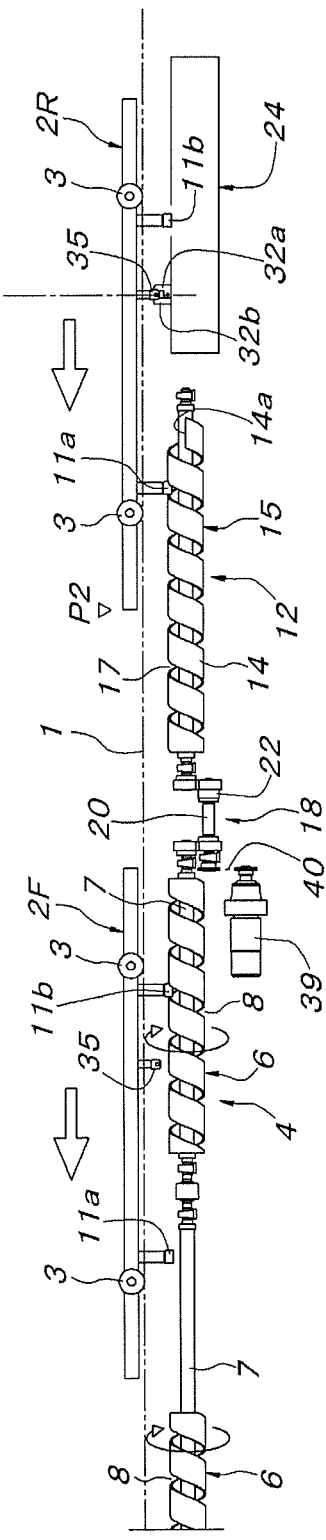
FIG. 6A
FIG. 6B

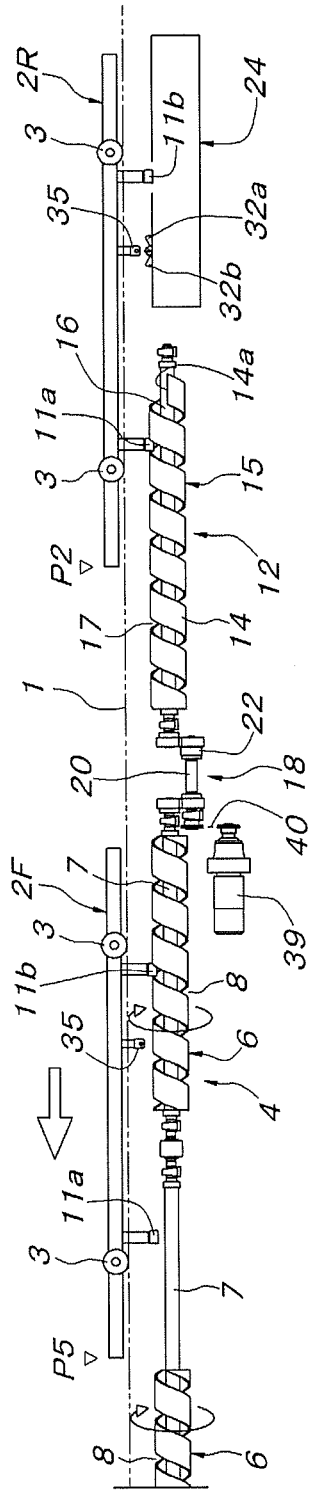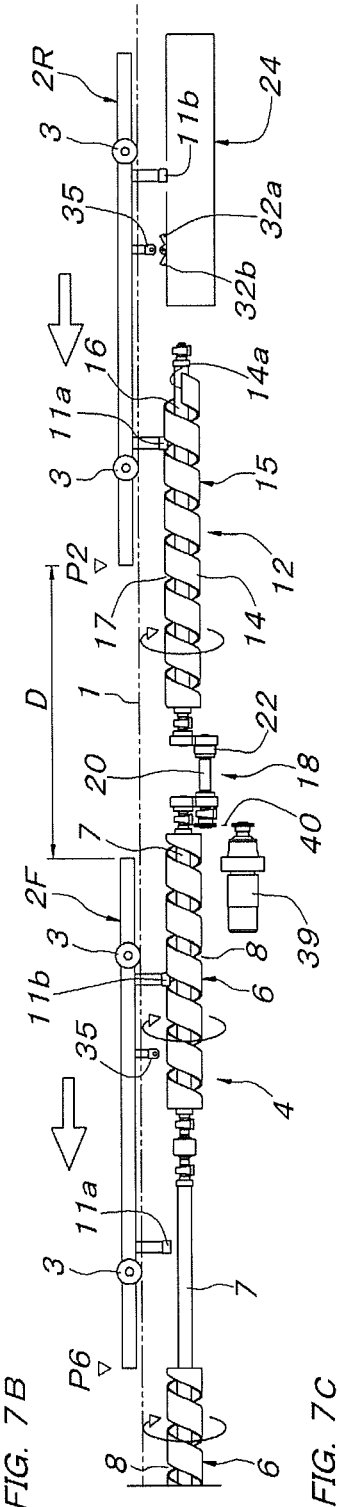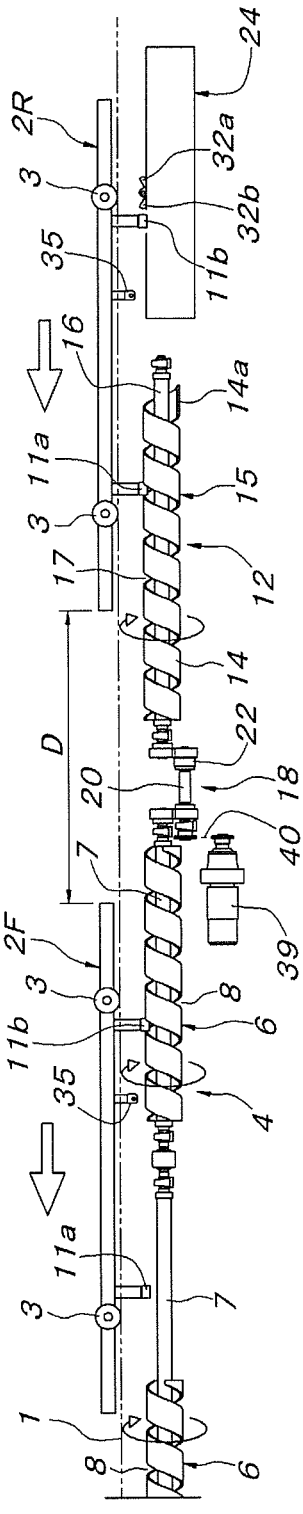

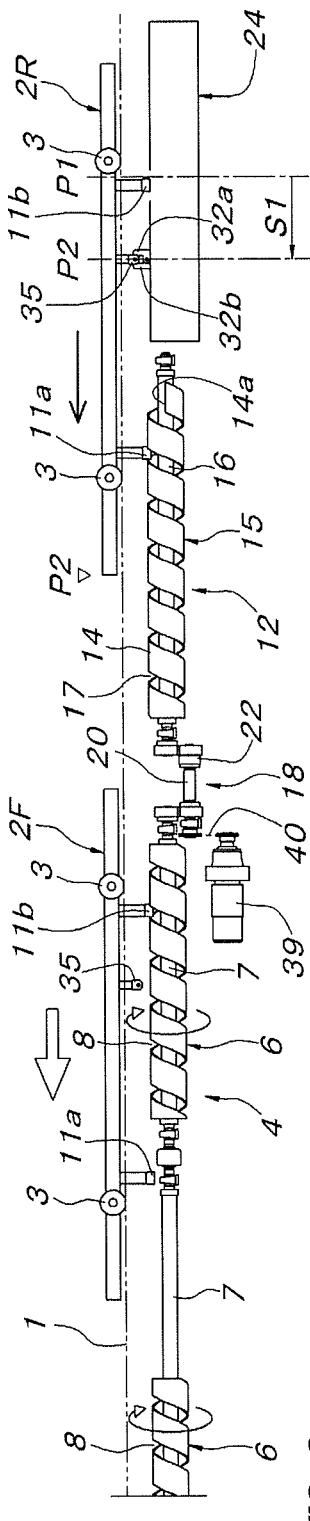
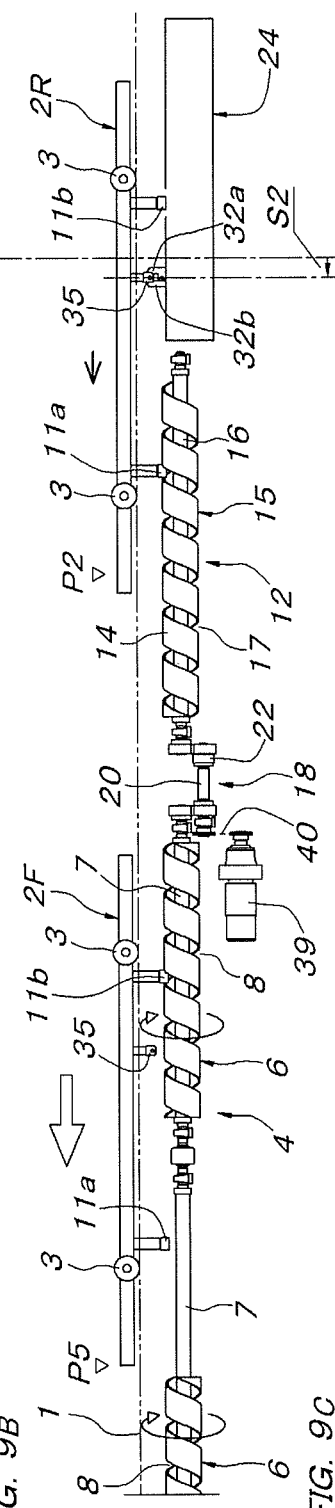
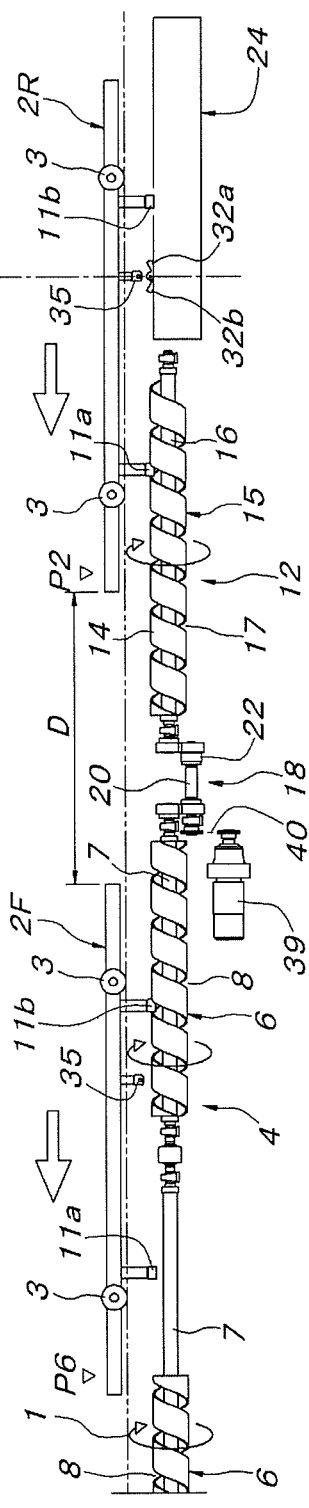
FIG. 9A
FIG. 9B
FIG. 9C

007
DEVICE FOR DELIVERING CONVEYING TRUCK INTO SCREW DRIVING AREA

FIELD OF THE INVENTION

The present invention relates to a conveying truck delivering device for delivering a conveying truck into a screw driving area equipped with a truck propulsion screw to be engaged with a driven roller of the conveying truck and for starting screw drive.

BACKGROUND OF THE INVENTION

There is known screw-driven delivery equipment in which a rotationally driven truck propulsion screw is supported along a truck travel path at a screw driving area in the truck travel path and a driven roller to be engaged with the truck propulsion screw is supported to a conveying truck on the truck travel path. In screw-driven delivery equipment described in Japanese Unexamined Patent Application Publication No. 2010-47399, for example, it is known that the truck propulsion screw within the screw driving area is divided and front-rear adjacent truck propulsion screws are linked and coupled to each other via a single position electromagnetic clutch in which engagement is made only at one point in one rotation.

SUMMARY OF THE INVENTION

However, where only a specific zone is constructed as the screw driving area but not the entire area of the truck travel path, a conveying truck located on the truck travel path before the screw driving area needs to be delivered into the screw driving area. At this moment, it is extremely difficult to deliver in a timely manner the conveying truck so as for the driven roller of the conveying truck to be smoothly entered into a spiral groove of the rotating truck propulsion screw located at an entrance of the screw driving area. Practical conveying truck delivering devices have not been proposed yet. According to the configuration described in Patent Document 1 for example, one of the truck propulsion screws which is at a halt and engaged with the driven roller of the conveying truck is started to be driven with the phase thereof synchronized with a truck propulsion screw downstream thereof, by switching the electromagnetic clutch between the truck propulsion screw and the downstream truck propulsion screw from a disengaged state to an engaged state, and the stopping conveying truck is started and the driven roller thereof is transferred smoothly to the downstream truck propulsion screw, and the screw drive can be continued. However, no means for solving the problem of how to first deliver the conveying truck into the screw driving area described in Patent Document 1 is disclosed.

The present invention proposes a device for delivering a conveying truck into a screw driving area, capable of solving the foregoing conventional problem. Described by giving reference numerals in parentheses used in descriptions of embodiments which will be described later in order to facilitate understanding the relationship with the embodiments, a device for delivering a conveying truck into a screw driving area according to the present invention, in screw-driven delivery equipment in which a rotationally driven truck propulsion screw (4) is supported along a truck travel path at the screw driving area in the truck travel path and a driven roller (11a) to be engaged with the truck propulsion screw (4) is supported to a conveying truck (2) on the truck travel path, the device is composed of a truck delivery screw (12) supported at an entrance of the screw driving area and having the same feeding pitch as the truck propulsion screw (4) wherein the truck delivery screw (12) and the truck propulsion screw (4) are linked and coupled to each other via a single position electromagnetic clutch (22) which engages only at one point in one rotation, and the truck propulsion screw (4) and the truck delivery screw (12) are configured to rotate in the same phase in an engaged state of the electromagnetic clutch (22), front and back driven rollers (11a, 11b) supported to the conveying truck (2) at an interval engageable with both of the truck propulsion screw (4) and the truck delivery screw (12), and a truck delivery means (24) juxtaposed to deliver the conveying truck (2) in a disengaged state of the electromagnetic clutch (22) while rotating the truck delivery screw (12) by the front-side driven roller (11a) of the conveying truck (2), until this driven roller (11a) reaches a fixed position (P2) within the truck delivery screw (12).

According to the foregoing configuration of the present invention, the conveying truck having been delivered by an appropriate means including hand pushing to a position in which delivery by the conveying truck delivery means juxtaposed at an entrance side of the screw driving area is started is delivered while rotating the truck delivery screw by the front-side driven roller of the conveying truck, by bringing the conveying truck delivery means in operation, until this driven roller reaches the fixed position within the truck delivery screw. This truck delivery operation can be performed regardless of the phase of the truck propulsion screw rotationally driven downstream of the truck delivery screw. Therefore, the operation can be started at a given timing as long as a preceding conveying truck is away downstream from the truck delivery screw and the electromagnetic clutch is switched into a disengaged state and the truck delivery screw is in a freely rotatable state.

Further, when the front-side driven roller of the conveying truck is delivered with respect to the truck delivery screw in the freely rotatable state, this driven roller needs to be able to smoothly enter a spiral groove of the truck delivery screw. This can be solved only by setting timing of disengaging the electromagnetic clutch and switching the truck delivery screw into the freely rotatable state such that a circumferential position (a phase angle) of the truck delivery screw at an entrance of the spiral groove agrees with the position of the driven roller of the conveying track to be delivered by the conveying truck delivery means.

After the delivery of the conveying truck by the conveying truck delivery means is completed, the electromagnetic clutch is switched from the disengaged state to the engaged state slightly before a preceding conveying truck reaches a predetermined position in the screw driving area and an interval with a standby conveying truck waiting while the driven roller thereof is engaged at a fixed position in the truck delivery screw reaches a predetermined interval. The truck delivery screw is rotationally driven while synchronized in phase with the truck propulsion screw adjacent at the downstream side thereof, whereby the standby conveying truck can be advanced by the truck delivery screw at the same speed as the preceding conveying truck. Since the conveying truck having started to be advanced by the truck delivery screw is rotationally driven while the truck delivery screw is synchronized in phase with the truck propulsion screw adjacent at the downstream side thereof, the conveying truck is reliably delivered into the screw driving area by using the pair of front and back driven rollers of the conveying truck and continues to be advanced while keeping a constant interval with the preceding conveying truck.

According to the configuration of the present invention, as described above, where a conveying truck is delivered to the screw driving area in the state of forward driving another conveying truck, the following conveying truck can be smoothly delivered at a necessary interval with respect to the preceding conveying truck driven forward at the screw driving area, if the single position electromagnetic clutch is switched into the engaged state at a necessary timing, as long as the conveying truck to be delivered is delivered by an appropriate means to a fixed position of the truck delivery screw in the freely rotatable state juxtaposed at the entrance of the screw driving area. That is, there is no need to temporarily stop the rotationally driven truck propulsion screw of the screw driving area or to deliver the conveying truck with precise timing with respect to the rotationally driven truck propulsion screw. The delivery of the conveying truck with respect to the screw driving area can be simply and easily performed without affecting at all the driving status of the preceding conveying truck within the screw driving area.

When the foregoing present invention is carried out, the truck delivery screw (12) can be such that a screw main body (15) formed by spirally winding a band plate (14) is supported to a drive shaft (16) concentrically, and the band plate (14) at an entrance side end of the truck delivery screw (12) can be formed with an end side (14a) parallel to the drive shaft (16), and in the disengaged state of the electromagnetic clutch (22), the truck delivery screw (12) can be configured to be stabilized in a phase that the end side (14a) is circumferentially displaced from an upper position of the drive shaft (16) due to weight balance, and the driven rollers (11a, 11b) of the conveying truck (2) can be configured to be engaged with a spiral groove portion (17) of the screw main body (15) above the drive shaft (16) of the truck delivery screw (12).

According to the foregoing configuration, a driven roller pull-in portion where the driven roller of the conveying truck can enter the spiral groove without interfering with the end portion of the screw main body constituting the truck delivery screw can be secured reliably at the entrance side end of the truck delivery screw having been switched into the freely rotatable state, regardless of timing of disengaging the electromagnetic clutch. Therefore, as described earlier, such labor can be eliminated as switching the electromagnetic clutch into the disengaged state at a fixed timing, or checking to see that the truck delivery screw is in the phase not interfering with the driven roller of the conveying truck each time when the conveying truck is delivered to the truck delivery screw side by the conveying truck delivery means, and having to rotate the truck delivery screw a necessary angle if there is the possibility of interference. As long as the truck delivery screw is in the freely rotatable state, the conveying truck can be delivered reliably to the fixed position of the truck delivery screw by the conveying truck delivery means.

The truck delivery means used in the present invention may be of any configuration. However, the truck delivery means (24) can be composed of a held portion (35) provided to the conveying truck (2), a movable base (28) is supported to reciprocate freely along the truck travel path, a movable base driving device (30) for reciprocating the movable base (28), a pair of front and back holding pieces (32a, 32b) supported on the movable base (28) and holding the held portion (35) from front and back, and a driving device for the pair of front and back holding pieces (34) mounted on the movable base (28) so as to open and close both holding pieces (32a, 32b) individually.

According to this configuration, the held portion can be reliably held between the pair of front and back holding pieces and the conveying truck can be delivered to the fixed position of the truck delivery screw even if the position of the conveying truck whose delivery is started by the truck delivery means is slightly displaced forward or rearward, so long as the held portion of the conveying truck is located within an area corresponding to between the pair of opening and closing front and back holding pieces.

Further, when the rotation drive of the truck delivery screw is started at the point of time when the phases of the truck delivery screw and the truck propulsion screw downstream thereof are synchronized after the electromagnetic clutch is switched into the engaged state, the truck delivery screw is rotationally driven at the same feeding speed as the conveying truck feeding speed at the screw driving area and tries to drive the stopping conveying truck at that feeding speed. As a result, a significantly large impacting force is exerted between the truck delivery screw and the driven roller of the conveying truck.

In order to solve the problem as above, the truck delivery means (24) can be configured to perform a first-stage delivery action (S1) of forcibly delivering the conveying truck (2), in the disengaged state of the electromagnetic clutch (22), until the front-side driven roller (11a) of the conveying truck (2) reaches a fixed position (P2) within the truck delivery screw (12), and a second-stage delivery action (S2) of further delivering the conveying truck (2) having been delivered in the first-stage delivery action (S1), in synchronization with an engaging of the electromagnetic clutch (22).

According to this configuration, the truck delivery screw not subjected to the turning force from the truck propulsion screw yet and in the freely rotatable state is forced to be rotated by the driven roller of the conveying truck through the second-stage delivery action of the truck delivery means having been started by an engaging of the electromagnetic clutch. After that, the truck delivery screw is subjected to the turning force from the truck propulsion screw via the electromagnetic clutch and then rotationally driven. That is, when the truck delivery screw is subjected to the turning force from the truck propulsion screw via the electromagnetic clutch and then rotationally driven, the truck delivery screw is already rotationally driven by the driven roller of the conveying truck forward traveling while subjected to the second-stage delivery action of the truck delivery means. Thus, a difference in rotational speed before and after the truck delivery screw is subjected to the turning force from the truck propulsion screw via the electromagnetic clutch can be made smaller depending on the setting of advancing speed of the conveying truck at the time of second-stage delivery action of the truck delivery means. As a result, a large impact force can be avoided from acting between the truck delivery screw and the driven roller of the conveying truck when the conveying truck is delivered to the screw driving area downstream thereof by the rotational drive of the truck delivery screw, and the delivery of the conveying truck can be reasonably and smoothly started even if the advancing speed of the conveying truck at the screw driving area is fast.

BRIEF DESCRIPTION OF THE DRAWINGS

FIG. 1A is a side view showing an embodiment of the device for delivering the conveying truck into the screw driving area and FIG. 1B is an enlarged side view showing a transmission means of a main part of the device.

FIGS. 6A and 6B are side views showing the first stage and the second stage of the conveying truck delivery operation.

FIGS. 7A to 7C are side views showing the third to fifth stages of the same.

FIG. 9A to 9C are side views showing the first to third stages of operation by the conveying truck delivering device in the second embodiment of the present invention.

DETAILED DESCRIPTION OF THE INVENTION

Figure 2:
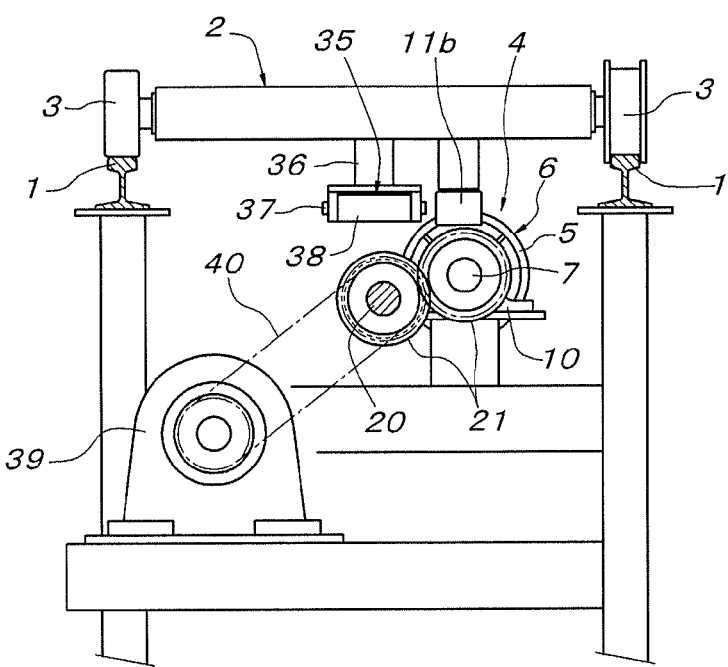
FIG. 2 is a longitudinal sectional rear view showing a conveying truck and a truck propulsion screw at the screw driving area.

In FIGS. 1 to 4, reference numeral 1 denotes a pair of left and right guide rails constituting a truck travel path. A conveying truck 2 is supported to travel freely on these guide rails 1 via wheels 3. In the truck travel path, a screw driving area composed of a truck propulsion screw 4 supported in parallel with the truck travel path (the guide rails 1) below the truck travel path is provided. The foregoing truck propulsion screw 4 is constituted of a plurality of screw main bodies 6 in concentric series. Each screw main body 6 is formed by spirally winding a band plate 5 and is supported to a drive shaft 7 concentrically. A spiral groove portion 8 concentric with the drive shaft 7 is formed between adjacent band plates 5. The screw main bodies 6 have a fixed length and are arranged in concentric series at fixed intervals which are substantially equal to the length of the screw main bodies 6 and are an integral multiple of a feeding pitch of the spiral groove portion 8. Between respective screw main bodies 6, a relay drive shaft 9 connecting parts of the drive shafts 7 supporting the screw main bodies 6, the parts extending from the screw main bodies 6, or the drive shafts 7 together is disposed. As a matter of course, the drive shafts 7 arranged in concentric series and the relay drive shafts 9 are linked and coupled via shaft couplings and supported by bearings 10 in a state that phases of the spiral groove portions 8 of all screw main bodies 6 arranged in series at the fixed intervals are synchronized.

The conveying truck 2 has a bottom portion on which a pair of front and back driven rollers 11a, 11b to be fitted, above the drive shaft 7, into the spiral groove portions 8 of each screw main body 6 of the truck propulsion screw 4 are supported rotatably about vertical axes. An interval L1 between these paired front and back driven rollers 11a, 11b is an integral multiple of the feeding pitch of the screw main bodies 6 of the truck propulsion screw 4 and is substantially equal to the length of the screw main bodies 6 (the interval between the screw main bodies 6). Thus, at the screw driving area, the truck propulsion screw 4 is rotationally driven, which leads to forward traveling continuously at a constant speed in such a manner that the front-side driven roller 11a is sent downstream from the termination of the spiral groove portion 8 of one screw main body 6 and concurrently the back-side driven roller 11b is drawn into the beginning of the spiral groove portion 8 of this screw main body 6 and the back-side driven roller 11b is sent downstream from the termination of the spiral groove portion 8 of one screw main body 6 and concurrently the front-side driven roller 11a is drawn into the beginning of the spiral groove portion 8 of an adjacent downstream screw main body 6.

At the entrance of the above-configured screw driving area, a truck delivery screw 12 concentrically linked and coupled to the truck propulsion screw 4 of the screw driving area is supported by a bearing 13. This truck delivery screw 12 has the same structure as the truck propulsion screw 4 and includes a band plate 14, a screw main body 15, a drive shaft 16, and a spiral groove portion 17. The length of the screw main body 15 is longer than that of the screw main body 6 of the truck propulsion screw 4, and the screw main body 15 has a length long enough for both of the paired front and back driven rollers 11a, 11b of the conveying truck 1 to be engaged therewith simultaneously. A beginning portion of the band plate 14 of the screw main body 15 of the truck delivery screw 12 is formed with an end side 14a parallel to the drive shaft 16 across almost the entire width of the band plate 14 in a direction parallel to the drive shaft 16. Thus, in a freely rotatable state that the rotating force is not applied to the truck delivery screw 12, this truck delivery screw 12 is configured to be stabilized in a phase that the end side 14a is circumferentially displaced from an upper position of the drive shaft 16 due to weight balance.

The termination of the truck delivery screw 12 configured as above and the beginning of the truck propulsion screw 4 at the screw driving area are linked and coupled by a transmission means 18. This transmission means 18 is constituted of a short relay drive shaft 20 supported by a bearing 19 at a position laterally away from an axis mutually concentric with the truck delivery screw 12 and the truck propulsion screw 4 and also parallel thereto, a pair of spur gears 21 linking and coupling the rear end of the relay drive shaft 20 and the front end of the drive shaft 7 of the truck propulsion screw 4, and a single position electromagnetic clutch 22 and a pair of spur gears 23 linking and coupling the front end of the relay drive shaft 20 and the rear end of the drive shaft 16 of the truck delivery screw 12. The single position electromagnetic clutch 22 is an electromagnetic clutch capable of engaging at one point in one rotation. In an engaged state of the electromagnetic clutch 22, the truck propulsion screw 4 and the truck delivery screw 12 are configured to rotate in the same phase. In this embodiment, a speed reducer equipped motor 39 for driving the truck propulsion screw 4 is linked and coupled to the rear end of the relay drive shaft 20 via a chain transmission means 40. However, the speed reducer equipped motor 39 can also be linked and coupled to the drive shaft 7 of the truck propulsion screw 4 or the relay drive shaft 9 at a given position within the screw driving area composed of the truck propulsion screw 4.

Figure 3:
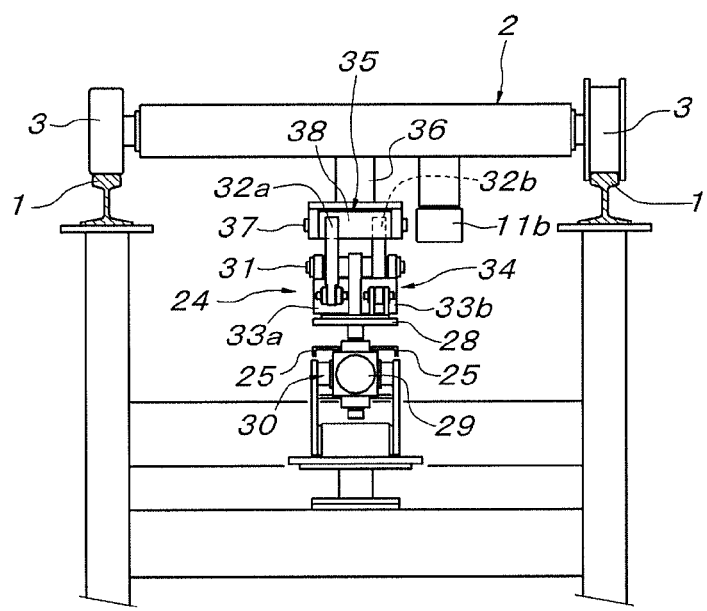
FIG. 3 is a longitudinal sectional rear view showing a conveying truck to be delivered into the screw driving area and the conveying truck delivering device.
Figure 4:
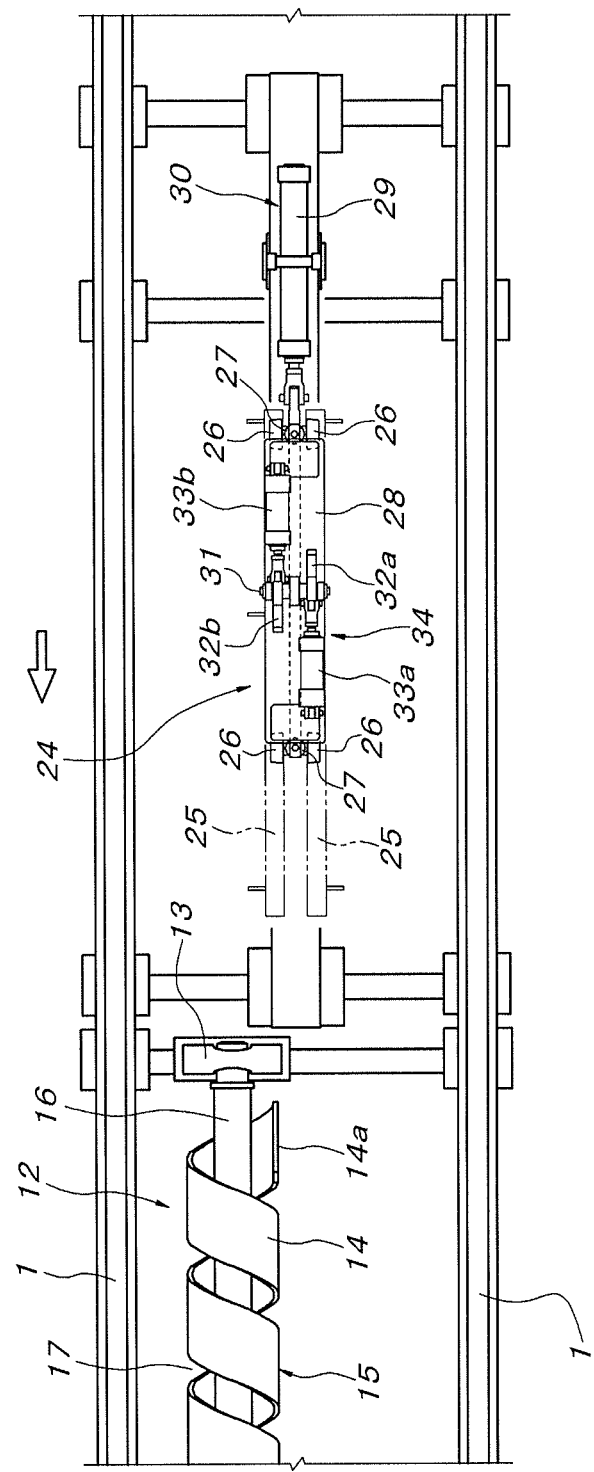
FIG. 4 is a plan view showing the conveying truck delivering device.

At a position upstream of the truck delivery screw 12 in the truck travel path, a truck delivery means 24 is arranged below the truck travel path. The truck delivery means 24 includes guide rails 25 laid in parallel with the truck travel path, a movable base 28, a movable base driving device 30, and a holding piece driving device 34 as shown in FIGS. 3 to 5. The movable base 28 is supported on the guide rails 25 so as to reciprocate freely within a fixed range, via supporting wheels 26 supported by horizontal support shafts and steady rollers 27 supported by vertical support shafts. The movable base driving device 30 is composed of a fluid pressure cylinder unit 29 for reciprocating the movable base 28. The movable base 28 is provided with a pair of front and back holding pieces 32a, 32b openably and closably supported by a common lateral horizontal support shaft 31. The holding piece driving device 34 is composed of fluid pressure cylinder units 33a, 33b interposed between the corresponding holding piece 32a, 32b and the movable base 28 and individually opening and closing the corresponding holding piece 32a, 32b. On the other hand, a held portion 35 to be held by the pair of front and back holding pieces 32a, 32b from front and back is provided on the bottom portion of the conveying truck 2. The held portion 35 is composed of a broad roller 38 supported between a pair of left and right bearings 36 by a lateral horizontal support shaft 37.

Further, in order to prevent the held portion 35 of the conveying truck 2 from interfering with the truck propulsion screw 4 and to prevent the driven rollers 11a, 11b of the conveying truck 2 from interfering with the truck delivery means 24, as shown in FIG. 3, the truck delivery means 24 and the held portion 35 of the conveying truck 2 are arranged at a center position in the left-right width direction of the conveying truck 2, and the truck propulsion screw 4 below the truck travel path and the paired front and back driven rollers 11a, 11b of the conveying truck 2 are shifted in the left-right lateral direction with respect to the center position in the left-right width direction of the conveying truck 2. Contrary to the above, it is a matter of course that the truck propulsion screw 4 and the paired front and back driven rollers 11a, 11b of the conveying truck 2 may be arranged at the center position in the left-right width direction of the conveying truck 2, and the truck delivery means 24 and the held portion 35 of the conveying truck 2 may be shifted in the left-right lateral direction with respect to the center position in the left-right width direction of the conveying truck 2, or that the truck propulsion screw 4 and the paired front and back driven rollers 11a, 11b of the conveying truck 2, and the truck delivery means 24 and the held portion 35 of the conveying truck 2 may be arranged as separated on the left and right sides with respect to the center position in the left-right width direction of the conveying truck 2.

Figure 5A:
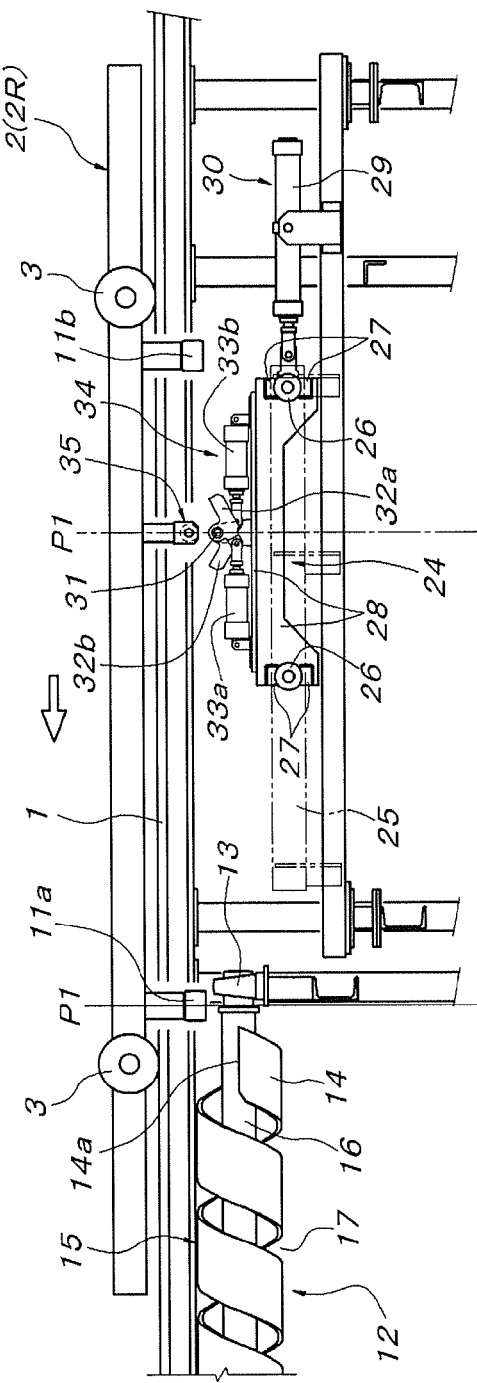
FIG. 5A is a side view showing a state before the conveying truck delivering device starts conveying truck delivery operation and FIG. 5B is a side view showing a state right after the conveying truck delivering device delivers the conveying truck for a necessary distance.
Figure 5B:
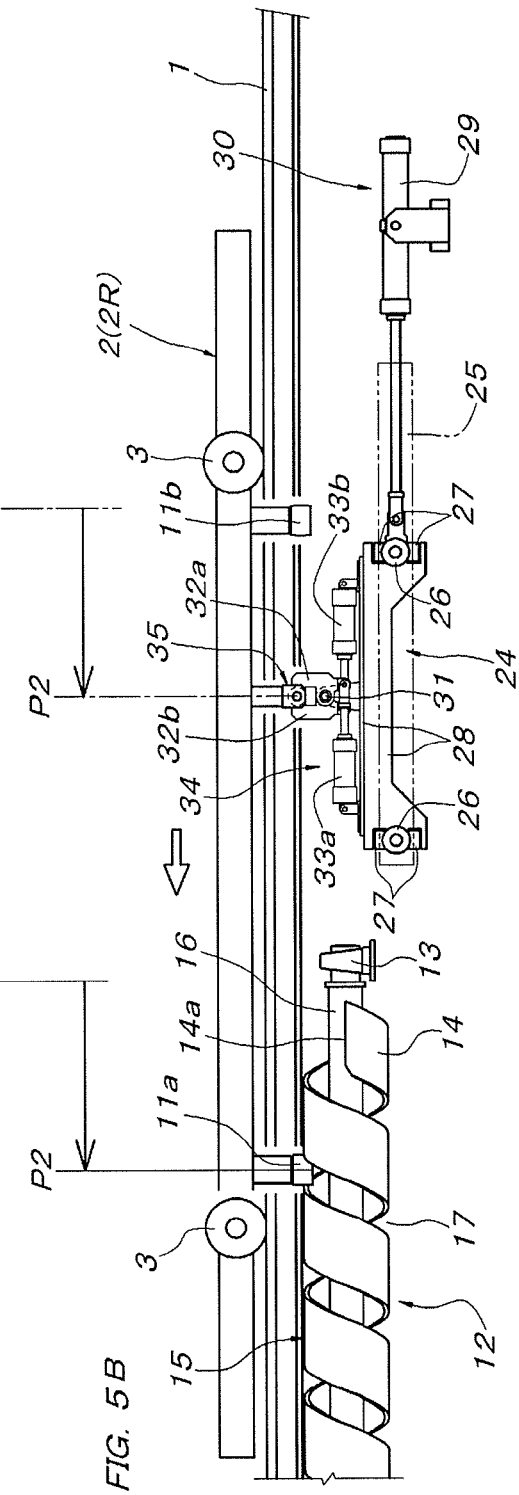

The above-configured truck delivery means 24 delivers the conveying truck 2 from a truck delivery starting position P1 in which the held portion 35 is located at a center position between the paired front and back holding pieces 32a, 32b at the time when the movable base 28 is at a backward limit position as shown in FIG. 5A to a truck standby fixed position P2 in which the held portion 35 is located at a center position between the paired front and back holding pieces 32a, 32b at the time when the movable base 28 is at a forward limit position as shown in FIG. 5B. When the conveying truck 2 is located at the truck delivery starting position P1, the front-side driven roller 11a thereof is located just before the beginning position of the truck delivery screw 12. When the conveying truck 2 is located at the truck standby fixed position P2, the front-side driven roller 11a thereof is located at a position having been entered by a necessary amount from the beginning position of the truck delivery screw 12.

Use and operation of the device for delivering the conveying truck into the screw driving area of the present invention configured as above will be described. The delivery work of the conveying truck 2 into the truck delivery starting position P1 is conducted by hand pushing or an appropriate feeder. This work is conducted when a preceding conveying truck 2F just before a following conveying truck 2R to be delivered into the truck delivery starting position P1 reaches a position P3 in which the back-side driven roller 11b of the preceding conveying truck 2F separates from the truck delivery screw 12 to the downstream side as shown in FIG. 6A. The electromagnetic clutch 22 is switched from the engaged state to the disengaged state when the preceding conveying truck 2F reaches the position P3. Consequently, power transmission to the truck delivery screw 12 is cut off, and the truck delivery screw 12 is brought into the freely rotatable state. Thus, as described earlier, the truck delivery screw 12 is stabilized in the phase that the end side 14a of the band plate 14 at the beginning side is circumferentially displaced from an upper position of the drive shaft 16 due to weight balance.

When the work of delivering the following conveying truck 2R into the truck delivery starting position P1 is performed, the movable base 28 of the truck delivery means 24 is located at the backward limit position and the pair of front and back holding pieces 32a, 32b are opened forward and backward. Upon delivery of the following conveying truck 2R into the truck delivery starting position P1 in such a state, the pair of front and back holding pieces 32a, 32b are closed by the fluid pressure cylinder units 33a, 33b of the holding piece driving device 34, and the held portion 35 (the broad roller 38) of the following conveying truck 2R is held between both holding pieces 32a, 32b. At this moment, the preceding conveying truck 2F is forward driven by the truck propulsion screw 4 normally driven by the speed reducer equipped motor 39 and the driven rollers 11a, 11b engaged with the truck propulsion screw 4. Thus, when this preceding conveying truck 2F reaches a fixed position P4 downstream from the position P3, the movable base 28 of the truck delivery means 24 in the state that the pair of front and back holding pieces 32a, 32b hold the held portion 35 of the following conveying truck 2R at the truck delivery starting position P1 is advanced from the backward limit position to the forward limit position by the fluid pressure cylinder unit 29 of the movable base driving device 30. As a result, the following conveying truck 2R is forcibly driven to advance from the truck delivery starting position P1, travels forward to the truck standby fixed position P2, and then stops, as shown in FIG. 6B. In forward traveling of the following conveying truck 2R at this time, the front-side driven roller 11a thereof pushes a side of the band plate 14 (a side not forming the spiral groove portion 17 due to the upper side of the band plate 14 opened) at the beginning portion of the truck delivery screw 12 in the freely rotatable state and enters the spiral groove portion 17 while rotating the truck delivery screw 12.

Slightly before the preceding conveying truck 2F reaches a fixed position P6 (see FIG. 7B) in which a predetermined inter-truck distance D with the following conveying truck 2R is secured as shown in FIG. 7A, for example, when reaching a fixed position P5 which is about a quarter of the feeding pitch (the lead) of the truck propulsion screw 4 before, the electromagnetic clutch 22 of the transmission means 18 is switched from the disengaged state to the engaged state. As a result, the electromagnetic clutch 22 is switched to the transmitting state when the truck propulsion screw 4 rotates about a quarter of the feeding pitch (the lead) from the point of time when the electromagnetic clutch 22 is engaged, that is, when the preceding conveying truck 2F reaches the fixed position P6. The rotating force of the truck propulsion screw 4 side (the turning force of the speed reducer equipped motor 39) is transmitted to the truck delivery screw 12 through the transmission means 18, and the truck delivery screw 12 is rotationally driven while keeping the same phase as the truck propulsion screw 4. The following conveying truck 2R stopping and waiting at the truck standby fixed position P2 is driven to advance via the front-side driven roller 11a, and the following conveying truck 2R travels forward while keeping the predetermined inter-truck distance D with the preceding conveying truck 2F as shown in FIG. 7C.

Figure 8A:
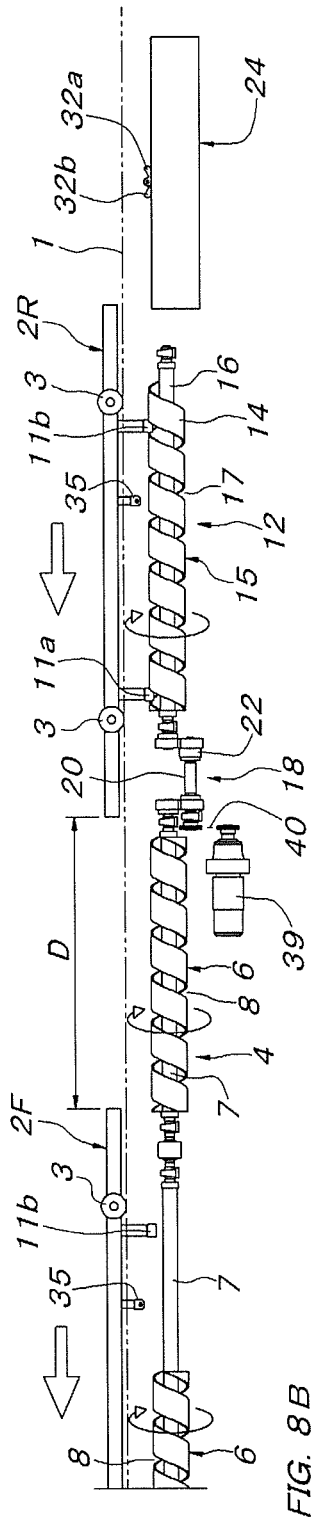
FIG. 8A to 8C are side views showing the sixth to eighth stages of the same.
Figure 8B:
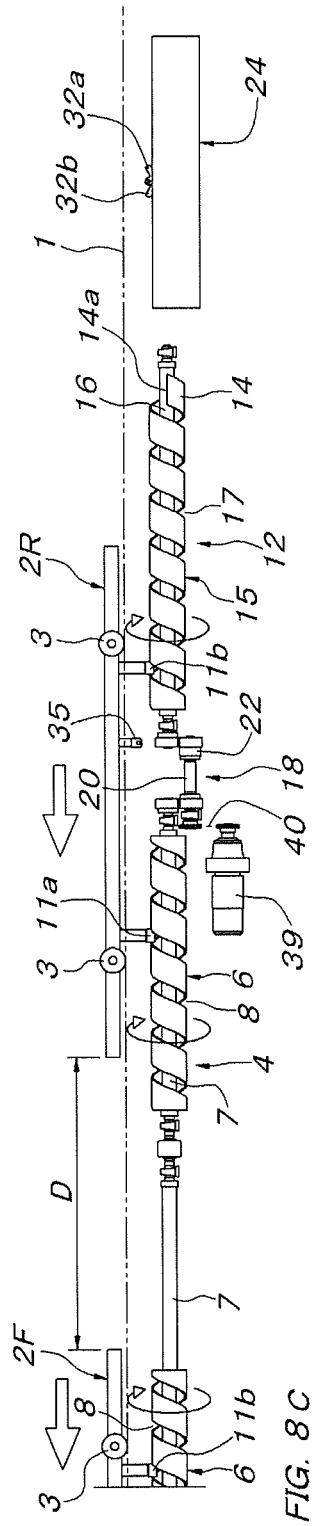

As a result of the following conveying truck 2R traveling forward in the above manner, the back-side driven roller 11b thereof enters the spiral groove portion 17 of the truck delivery screw 12, and the following conveying truck 2R is subjected to thrust from the truck delivery screw 12 via either one of the paired front and back driven rollers 11a, 11b or both driven rollers 11a, 11b as shown in FIG. 8A and continues traveling forward. After the front-side driven roller 11a separates from the termination of the truck delivery screw 12, the back-side driven roller 11b is subjected to thrust from the truck delivery screw 12 as shown in FIG. 8B and continues traveling forward. As a result of this forward travelling, the front-side driven roller 11a is transferred to the truck propulsion screw 4 side of the screw driving area. As described earlier, the truck propulsion screw 4 and the truck delivery screw 12 linked to each other by the electromagnetic clutch 22 rotate while keeping the same phase, so that the front-side driven roller 11a can smoothly and reliably enter the spiral groove portion 8 of the truck propulsion screw 4.

Figure 8C:
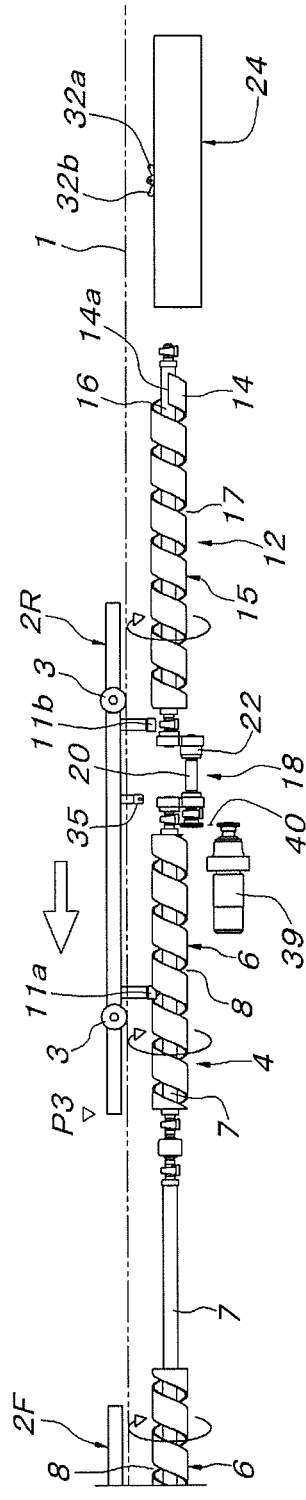

In the transfer process of the following conveying truck 2R from the truck delivery screw 12 to the truck propulsion screw 4 of the screw driving area as described above, the forward travelling of the following conveying truck 2R is continued while the front-side driven roller 11a of the following conveying truck 2R is subjected to thrust from the truck propulsion screw 4 and the back-side driven roller 11b is subjected to thrust from the truck delivery screw 12 as shown in FIG. 8B. Finally, as shown in FIG. 8C, the back-side driven roller 11b separates from the truck delivery screw 12, and the following conveying truck 2R is drawn into the screw driving area due to the thrust from the truck propulsion screw 4 to which the front-side driven roller 11a is subjected. Through the above operation, the following conveying truck 2R having been delivered to the truck standby fixed position P2 by the truck delivery means 24 and stopping and waiting is delivered to the screw driving area by the truck delivery screw 12, is driven by the truck propulsion screw 4, and travels forward while keeping the predetermined inter-truck distance D with the preceding conveying truck 2F.

Further, it is sufficient that the truck delivery means 24 having delivered the following conveying truck 2R from the truck delivery starting position P1 to the truck standby fixed position P2 opens the paired front and back holding pieces 32a, 32b by the fluid pressure cylinder units 33a, 33b of the holding piece driving device 34 and releases the holding operation of the held portion 35 of the following conveying truck 2R and then moves the movable base 28 rearward to the original backward limit position by the fluid pressure cylinder unit 29 of the movable base driving device 30. The opening operation of the paired front and back holding pieces 32a, 32b may be delayed until slightly before the truck delivery screw 12 is actually rotationally driven, for example, when the preceding conveying truck 2F reaches the fixed position P5 and the electromagnetic clutch 22 is engaged.

Additionally, in the shown embodiment, the interval between the termination of the truck delivery screw 12 and the beginning of the truck propulsion screw 4 of the screw driving area is made narrower than the interval L1 between the driven rollers 11a, 11b, and the entire length of the screw main body 15 of the truck delivery screw 12 is made longer than the interval L1. However, the interval between the termination of the truck delivery screw 12 and the beginning of the truck propulsion screw 4 of the screw driving area and the entire length of the screw main body 15 of the truck delivery screw 12 can be made almost the same as the interval L1 between the driven rollers 11a, 11b, and only either one of the paired front and back driven rollers 11a, 11b of the conveying truck 2 can be subjected to the thrust from the truck delivery screw 12 and the truck propulsion screw 4.

Next, the second embodiment of the present invention will be described based on FIG. 9. In this second embodiment, the movable base 28 of the truck delivery means 24 is configured to be capable of being advanced in two stages. That is, the movable base 28 is delivered from the truck delivery starting position P1 to the truck standby fixed position P2 in the first-stage delivery action S1 of the truck delivery means 24. The movable base 28 is delivered by a predetermined distance from the truck standby fixed position P2 in the second-stage delivery action S2 of the truck delivery means 24. This two-stage advance of the movable base 28 can easily be carried out for example, by employing a two-stroke cylinder unit as the fluid pressure cylinder unit 29 used as the movable base driving device 30.

The second embodiment will be described specifically. As shown in FIG. 9A, upon delivery of the movable base 28 from the truck delivery starting position P1 to the truck standby fixed position P2 by the first-stage delivery action S1 of the truck delivery means 24, the pair of front and back holding pieces 32a, 32b are made not to be opened and made to wait while holding the held portion 35 of the following conveying truck 2R. When the preceding conveying truck 2F reaches the fixed position P5, as shown in FIG. 9B, the electromagnetic clutch 22 is switched to the engaged state and concurrently the second-stage delivery action S2 of the truck delivery means 24 is carried out. During a time period until the preceding conveying truck 2F reaches the fixed position P6 shown in FIG. 9C from the fixed position P5, the phase of the rotationally driven truck propulsion screw 4 and the phase of the truck delivery screw 12 are not synchronized, and the transmission of the turning force to the truck delivery screw 12 by the electromagnetic clutch 22 is not performed yet. Thus, the truck delivery screw 12 is in the freely rotatable state. Consequently, the following conveying truck 2R waiting at the truck standby fixed position P2 advances while rotating the truck delivery screw 12 by the front-side driven roller 11a thereof, through the second-stage delivery action S2 of the truck delivery means 24. The delivery speed of the following conveying truck 2R by the second-stage delivery action S2 of the truck delivery means 24 at this moment is preferably set to be sufficiently slower than the forward driving speed of the preceding conveying truck 2F by the truck propulsion screw 4.

After the electromagnetic clutch 22 is switched to the engaged state as described above, the truck delivery screw 12 as well as the truck propulsion screw 4 rotates although at slow speed and thus the phase angle advances. Accordingly, the transmission of the turning force to the truck delivery screw 12 by the electromagnetic clutch 22 is not started at the point of time when the preceding conveying truck 2F reaches the fixed position P6 shown in FIG. 9C. The phases of the truck propulsion screw 4 and the truck delivery screw 12 are synchronized when the preceding conveying truck 2F advances from the fixed position P6 to a position where the interval with the following conveying truck 2R becomes the predetermined inter-truck distance D as shown in FIG. 9C, and then the transmission of the turning force to the truck delivery screw 12 by the electromagnetic clutch 22 is started. The action thereafter is the same as the earlier embodiment. Therefore, the description thereof will be omitted.

As for a time period of terminating the second-stage delivery action S2 of the truck delivery means 24, it is sufficient that a time slightly shorter than a necessary time after the start of the second-stage delivery action S2 until the transmission of the turning force to the truck delivery screw 12 by the electromagnetic clutch 22 is started is preset as described above, and the forward driving of the movable base 28 of the truck delivery means 24 is stopped after a lapse of the preset time from the start time of the second-stage delivery action S2 and also the pair of front and back holding pieces 32a, 32b are opened, and then the second-stage delivery action S2 is terminated, thereafter reciprocating the movable base 28 to the backward limit position. As a matter of course, it is also possible that the position of the preceding conveying truck 2F or the following conveying truck 2R at the point of time slightly before the transmission of the turning force to the truck delivery screw 12 by the electromagnetic clutch 22 is started as described above is preset and the second-stage delivery action S2 of the truck delivery means 24 is terminated as described above at the point of time when the preceding conveying truck 2F or the following conveying truck 2R reaches the preset position.

The conveying truck delivering device of the present invention can be utilized as a conveying truck delivering device capable of simply and easily delivering a conveying truck into a screw driving area provided in a truck travel path, from above the truck travel path upstream of the screw driving area without stopping conveying trucks traveling at the screw driving area.

It should be understood, of course, that the specific form of the invention herein illustrated and described are intended to be representative only, as certain changes may be made therein without departing from the clear teachings of the disclosure. Accordingly, reference should be made to the following appended claims in determining the full scope of the invention.

What is claimed is:

1. A device for delivering a conveying truck into a screw driving area, in screw-driven delivery equipment in which a rotationally driven truck propulsion screw is supported along a truck travel path at the screw driving area in the truck travel path and a driven roller to be engaged with the truck propulsion screw is connected to a conveying truck on the truck travel path, the device comprising:

a truck delivery screw supported at an entrance of the screw driving area and having a feeding pitch which is the same as a feeding pitch of the truck propulsion screw, the truck delivery screw and the truck propulsion screw being linked and coupled to each other via a single position electromagnetic clutch which engages only at one point in one rotation, the truck propulsion screw and the truck delivery screw are configured to rotate in the same phase in an engaged state of the electromagnetic clutch;

front and back driven rollers connected to the conveying truck at an interval engageable with both of the truck propulsion screw and the truck delivery screw; and a truck delivery means operable to deliver the conveying truck, in a disengaged state of the electromagnetic clutch, while rotating the truck delivery screw by the front-side driven roller of the conveying truck, until this driven roller reaches a fixed position within the truck delivery screw.

2. The device for delivering the conveying truck into the screw driving area according to claim 1, wherein the truck delivery screw comprises a screw main body formed by spirally winding a band plate which is connected to a drive shaft concentrically, and the band plate at an entrance side end of the truck delivery screw is formed with an end side parallel to the drive shaft, and in the disengaged state of the electromagnetic clutch, the truck delivery screw is configured to be stabilized in a phase that the end side is circumferentially displaced from an upper position of the drive shaft due to weight balance, and the driven rollers of the conveying truck are configured to be engaged with a spiral groove portion of the screw main body above the drive shaft of the truck delivery screw.

3. The device for delivering the conveying truck into the screw driving area according to claim 1, wherein the truck delivery means comprises a held portion provided to the conveying truck; a movable base is supported to reciprocate freely along the truck travel path; a movable base driving device for reciprocating the movable base; a pair of front and back holding pieces supported on the movable base and holding the held portion from front and back; and a driving device for the pair of front and back holding pieces, the driving device mounted on the movable base so as to open and close both holding pieces individually.

4. The device for delivering the conveying truck into the screw driving area according to claim 1, wherein the truck delivery means performs a first-stage delivery action of forcibly delivering the conveying truck, in the disengaged state of the electromagnetic clutch, until the front-side driven roller of the conveying truck reaches the fixed position within the truck delivery screw, and a second-stage delivery action of further delivering the conveying truck having been delivered by the first-stage delivery action, in synchronization with an engaging of the electromagnetic clutch.

5. The device for delivering the conveying truck into the screw driving area according to claim 2, wherein the truck delivery means comprises a held portion provided to the conveying truck; a movable base is supported to reciprocate freely along the truck travel path; a movable base driving device for reciprocating the movable base; a pair of front and back holding pieces supported on the movable base and holding the held portion from front and back; and a driving device for the pair of front and back holding pieces, the driving device mounted on the movable base so as to open and close both holding pieces individually.

* * * * *